United States Patent [19]

Longtin

[11] Patent Number: 5,566,879
[45] Date of Patent: Oct. 22, 1996

[54] SYSTEM FOR CENTRALIZED CONTROLLING OF A PLURALITY OF TEMPERATURE REGULATING DEVICES

[75] Inventor: Pierre Longtin, Ville Vanier, Canada

[73] Assignee: Comptel Domotique Inc., Sainte-Foy, Canada

[21] Appl. No.: 161,806

[22] Filed: Dec. 6, 1993

[51] Int. Cl.$^6$ .......................... G05D 23/00; H04M 11/04
[52] U.S. Cl. .................. 236/46 R; 165/205; 165/270; 219/483; 236/51; 340/310.01
[58] Field of Search .................... 236/51, 46 R; 165/22; 307/39; 219/483; 340/310.01

[56] References Cited

U.S. PATENT DOCUMENTS

| | | | |
|---|---|---|---|
| 4,362,270 | 12/1982 | Cleary et al. | 236/51 X |
| 4,682,648 | 7/1987 | Fried | 236/51 X |
| 4,916,642 | 4/1990 | Kaiser et al. | 165/22 X |
| 5,104,037 | 4/1992 | Karg et al. | 236/51 |
| 5,318,224 | 6/1994 | Darby et al. | 236/51 X |

FOREIGN PATENT DOCUMENTS

| | | |
|---|---|---|
| 1118512 | 2/1982 | Canada . |
| 1171938 | 7/1984 | Canada . |

*Primary Examiner*—William E. Wayner
*Attorney, Agent, or Firm*—Mila Shvartsman

[57] ABSTRACT

The present invention relates to a system for centralized controlling of a plurality of temperature regulating devices by an existing network of power lines comprising a central control means provided to send or receive predetermined commands to and from a plurality of temperature regulating devices. Each of those devices comprises a communication means adapted to provide two way communication with the central control means, a microprocessor means adapted to store predetermined information received from the central control means, a temperature sensor means adapted to send signals to the microprocessor means and an output means adapted to supply power to temperature varying units. The system further includes a network protecting means adapted to regulate the supply of power to output supply means during sudden change in power supply or due to changes in temperature conditions and a locking means adapted to prevent an unauthorized entry to change temperature condition. Preferably, the temperature regulating devices comprise at least one primary thermostat means and a predetermined number of secondary thermostat means. Those primary thermostat means are adapted to communicate with the central control means in independent manner. The primary thermostat means are capable to configure conditions of the secondary thermostat means.

43 Claims, 11 Drawing Sheets

SYSTEM FOR CENTRALIZED CONTROLLING OF A PLURALITY OF TEMPERATURE REGULATING DEVICES

The present invention relates to a system for centralized controlling of a plurality of temperature regulating devices and, more particularly, to a plurality of devices controlled through an existing network of power lines.

At the present time, there are known two main types of thermostats, such as: a bi-metal thermostat such as the one described in U.S. Pat. No. 2,873,368 to Welker et al. These thermostats have a rather poor precision and do not have means for their remote control.

Another type of thermostat is the electronic thermostat which is much more precise but is autonomous in that it cannot be remote-controlled.

There is known Canadian Patent 1,118,512 to Cleary et al describing an apparatus for providing centralized control for a plurality of temperature regulating units each separately controlled by a local, thermostatically controlled device powered by an existing electrical distribution network comprising:

an electrical distribution network transmitter for imposing electrical pulses of a preselected control frequency on said electrical distribution network to a predetermined condition;

receiver means, at the location of a local thermostatic control device, for connecting and disconnecting the thermostatically controlled device to the electrical distribution network responsive to pulses of said control frequency on said electrical distribution network;

a coaxial cable network transmitter means for transmitting control signals at a predetermined carrier frequency on a coaxial cable network responsive to a predetermined condition; and coaxial cable network receiving means for detecting said control signals transmitted on the coaxial cable network, wherein said electrical distribution network transmitter imposes said electrical pulses on the electrical power distribution network responsive to detection of said control signals by said coaxial cable network receiver means.

This patent to Cleary et al describes in general one way communication systems wherein a separate thermostat is needed.

There is also known Canadian Patent 1,171,938 to Bensoussan et al describing an electronic controller which controls the application of electric power to a temperature varying device characterized in that it comprises:

a thermal sensor which generates an electric signal, one of the characteristics of which varies as a function of the ambient temperature;

a movement detector which generates an electric signal, one characteristic of which depends on the presence or absence of movement within its field of detection and/or a light detector which generates an electric signal, one characteristic of which varies as a function of the luminosity within its field of detection;

a programmable memory unit;

means to address this memory unit with a program of temperatures which are pre-selected in accordance with the said characteristics of the electric signals generated by said movement detector and/or said light detector;

means to read the information contained in said memory unit and to generate an electrical signal representing the temperature pre-selected in accordance with said characteristics of the electric signals generated by the movement detector and/or the light detector;

means receiving said electrical signals which correspond to the ambient temperature and those electrical signals which correspond to a pre-selected temperature stored in said memory unit and to generate, by means of a control unit, a control signal for the temperature varying device as a function of the difference between said electrical signals.

This patent to Bensoussan et al does not show a communication module inside the unit.

One of the main problems arising when installing an environment control system consists in the installation of a heating control. More and more homes are equipped with electric heating baseboards. In order to control this type of heating by a central controller, a temperature sensor must be installed in each of the zones to be controlled and, moreover, low voltage relays must be installed on the electric power line so as to be activated by the central controller which uses a low voltage.

The only efficient way of avoiding this problem in already built houses is the transmission of the control information through the existing power lines in the homes. This information could be transmitted by the devices which control the electric baseboards, namely the thermostats.

Another problem of existing thermostats is that they switch on the electric current to the baseboards in an instantaneous manner when the power supply is restored after a supply stoppage. The problem is more important in cold weather since the room temperature rapidly decreases and when the electric supply is restored, all the thermostats switch on at the same time. Such a situation when occurring on a large portion of the electric supply network will often cause a new current stoppage.

Another problem of existing thermostats consists in the fact that young children can easily tamper with the temperature settings, thus causing electricity waste and the resultant room overheating can be a fire risk.

In accordance with the invention, these problems are solved by using an electronic thermostat capable of receiving and transmitting control information on the existing electric power lines and in accordance with a defined protocol. Moreover, by incorporating certain line supervising functions, the baseboards can be activated in accordance with a predetermined delay after restoration of the public electric supply. Moreoever, to avoid tampering with the thermostat setting, an electronic lock is provided to deactivate the buttons serving to adjust the temperature setting.

SUMMARY OF THE INVENTION

Broadly, the present invention relates to a system for centralized controlling of a plurality of temperature regulating devices by an existing network of power lines comprising a central control means provided to send or to receive predetermined commands to and from a plurality of temperature regulating devices, each of said temperature regulating devices comprising:

a communication means adapted to provide two way communication with said central control means;

a microprocessor means adapted to store predetermined information received from said central control means and to provide a proper functioning of said device;

a temperature sensor means adapted to send signals to said microprocessor means; and an output supply means adapted to supply power to temperature varying regulating units; and wherein said temperature regulating device further comprises a network protecting means adapted to regulate the supply of power to said output supply means during sudden changes in the power supply or due to changes in temperature conditions; and wherein said temperature regulating device is adapted to prevent an unauthorized entry to change temperature conditions of said temperature regulating device by locking means.

Said temperature regulating device comprises preferably at least one primary thermostat means and a predetermined number of a secondary thermostat means wherein said primary and secondary thermostat means are adapted to communicate with said central control means in independent mode, wherein said primary and secondary thermostat means are adapted to communicate with each other by means of commands sent through their own microprocessor means, and wherein said central control means send or receive commands to and from said temperature regulating device by means of high frequency signals applied to said power lines.

Said output supply means supply power to said temperature regulating units in a time delay mode to avoid undesirable or excessive temperature variations wherein said output supply means supply power to said temperature varying units by means of predetermined commands sent from said microprocessor means.

Said network protecting means regulate the supply of power to said output supply means by means of predetermined commands sent from said microprocessor means.

Said primary thermostat means are adapted to configure conditions of said secondary thermostat means wherein configuration of said secondary thermostat means is provided by means of sending commands through said microprocessor means.

Said locking means of said primary and secondary thermostat means are activated in independent manner.

Said network protecting means comprises:

a power supply means adapted to receive power through said power supply lines; and a line monitor means adapted to determine the sudden change of power wherein said network protecting means is activated by signals sent from said line monitor means during sudden change of power voltage; and wherein said network protecting means is activated by means of predetermined commands sent from said microprocessor means during changes of set temperature.

Said output supply means supply power to said temperature varying units by means of time delay mode consisting in limiting the time of supply of a current to said units wherein, during a network protecting mode, the supply of the current to each of said temperature varying units is provided randomly to prevent simultaneous activation of all of said output power supply means.

Said central control means comprises a predetermined sequence of command stored in a permanent memory of said microprocessor means, and wherein said central control means further comprises a long distance control means provided to monitor and modify temperature setting of said temperature regulating units.

Yet, another object of the prevent invention is a method of a centralized control of a plurality of temperature regulating devices comprising:

sending commands to each of said temperature regulating devices by communication means;

receiving signals from temperature sensors of said temperature regulating devices after those signals are being processed by a microprocessor means of said devices;

verifying signals received from said temperature regulating devices and sending appropriate correcting commands necessary to amend the temperature conditions of each of said temperature regulating devices, wherein a process of supplying power to temperature varying unit is provided by means of an output power supply means in a time delay mode to avoid undesirable or excessive temperature variations, and wherein a process of power supply to each of said temperature regulating devices is provided by means of a network protecting means regulating the supply of power during sudden changes in power supply or due to changes in temperature conditions.

Said time delay mode provided for limiting power supply to said temperature varying units comprises the following steps:

verification of the difference between an ambient temperature and a set temperature by means of signals received from said temperature sensor means;

calculating a time delay at the end of which the ambient temperature will reach the set temperature by means of said microprocessor means;

sending signals causing variation of power supply to said output supply means, wherein said signal is being maintained at a certain value to keep the ambient temperature substantially constant;

correcting said signal at a regular interval.

Said network protecting mode comprises the following steps:

detecting a sudden change of power voltage or sudden temperature change;

transmitting command to said microprocessor means;

entering network protecting mode causing a limitation of a signal to said output power supply means, wherein detection of a sudden change in power voltage is provided by a power supply means and a line monitor means, and wherein detection of sudden change of power voltage or sudden temperature change is provided by means of predetermined commands sent from said microprocessor means.

Still, another object of the present invention is a temperature regulating device comprising:

a communication means adapted to provide two way communication through an existing network of power lines;

a microprocessor means adapted to store predetermined information received from said communication means and to provide a proper functioning of said device;

a temperature sensor means adapted to send signals to said microprocessor means; and an output supply means adapted to supply power to temperature varying units, wherein said temperature regulating device further comprises a network protecting means adapted to regulate the supply of power to said output supply means during sudden changes in the power supply, or due to changes in temperature conditions, and wherein said temperature regulating device is adapted to prevent an unauthorized entry to change temperature conditions of said temperature regulating device by locking means.

DESCRIPTION OF THE PREFERRED EMBODIMENTS

Figure 1:
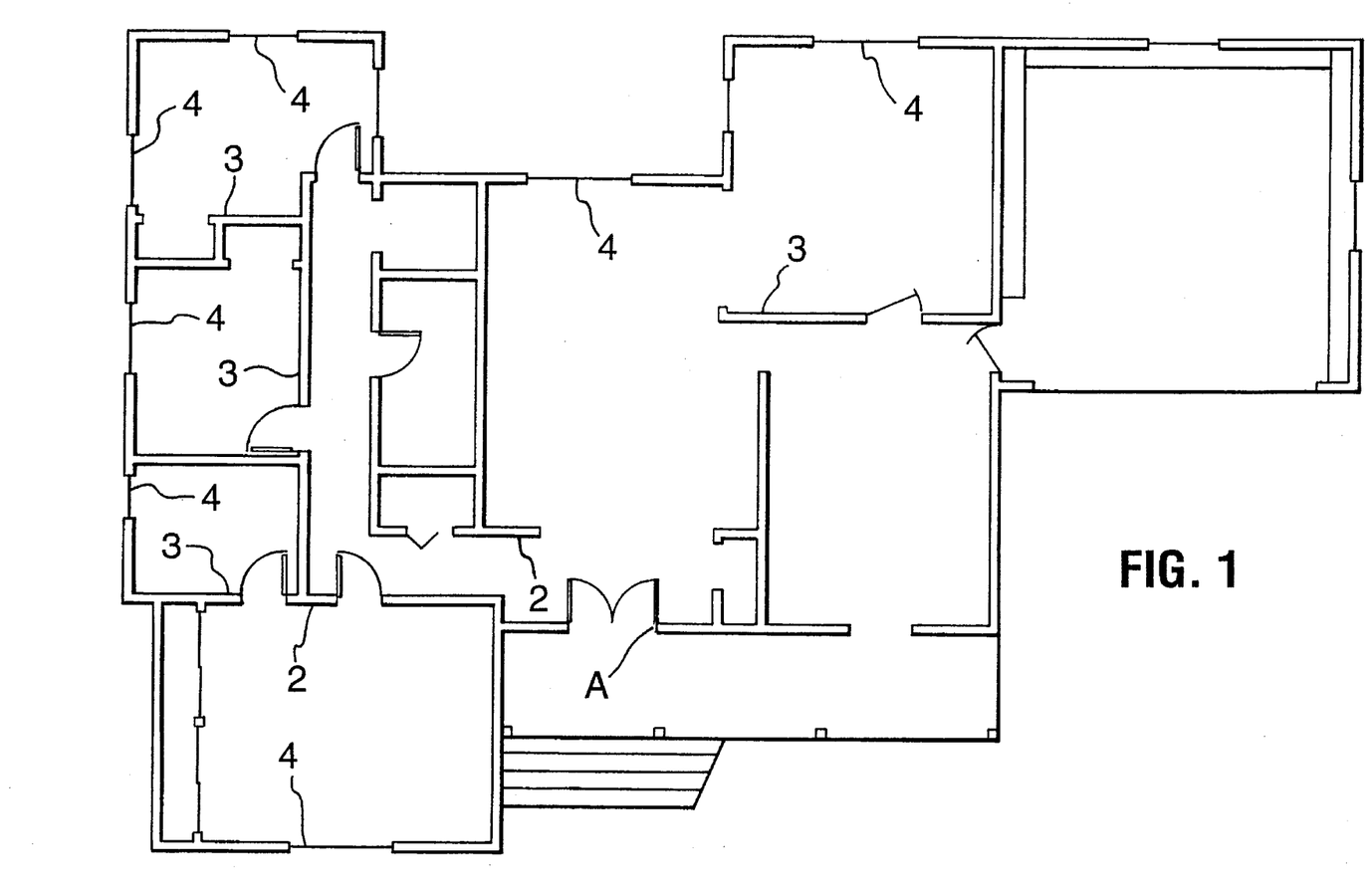
FIG. 1 is a plan view of the layout of a house equipped with the temperature regulating device of the invention.
Figure 2:
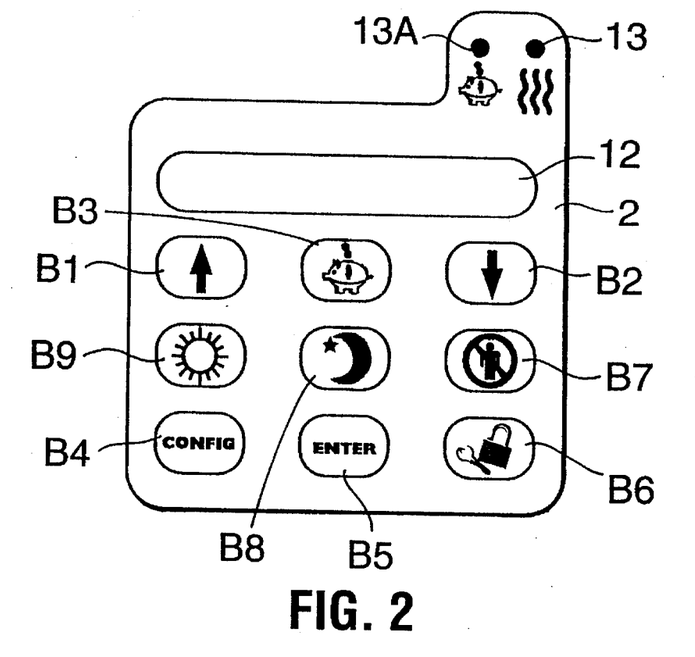
FIG. 2 shows a front view of the primary thermostat of the present invention.
Figure 3:
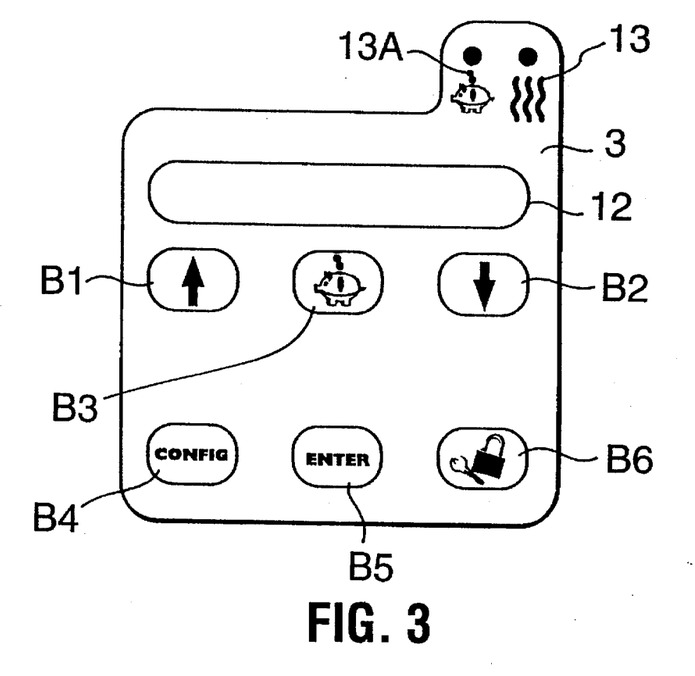
FIG. 3 shows a front view of secondary thermostat of the present invention.

Referring now to FIGS. 1 to 3, the primary thermostat 2 of the present temperature regulating device is installed near the house entrance A, while each secondary thermostat 3 are installed in the other rooms in which temperature is to be controlled. Each thermostat 2 or 3 supplies power to the electric heating baseboards 4 located in the same room.

All the thermostats function independently one of the other. The number of secondary thermostats with respect to a primary can vary.

Figure 4:
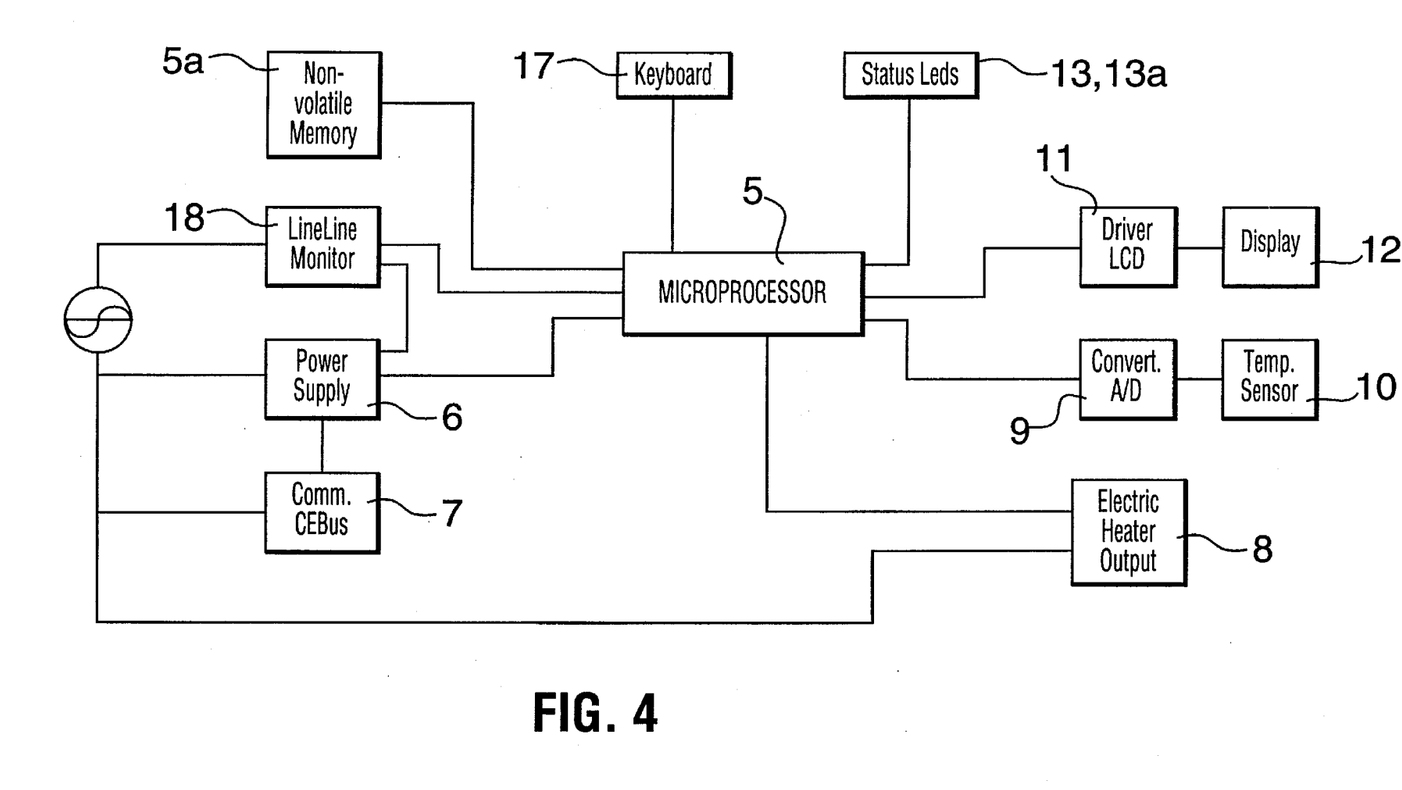
FIG. 4 shows a block diagram of the present invention.

Commercial and industrial heating can be controlled as well as residential heating. Each thermostat, whether primary or secondary, is composed of the following items:

- a central micro-processor means 5 controlling, by means of a central control means, the various external components and capable of accomplishing calculations for the proper functioning of the thermostat;
- a non-volatile memory 5a to store the software and the data necessary for the proper functioning of the thermostat. These informations are stored in a permanent manner, even if the electric supply fails.
- central control means comprising a predetermined sequence of commands which, the preferred embodiment, are stored in the memory 5a of the microprocessor 5.
- a power supply 6 enabling to convert an alternating current signal into a continuous signal at a desired voltage and current in order to properly supply the various components of the thermostats;
- a communication means or module 7 using the CEBUS® protocol or standard enabling to receive and transmit the information on the power lines and supply network, wherein CEBUS® is a local communication and control network designed specifically for the home. The CEBUS® network provides a standardized communication facility for exchange of control information and data among devices and services in the home. In CEBUS®, one of the media of transmission are the power lines and the protocol includes rules of behavior for access and use of a communication network; CEBUS® is a registered trade mark of the Electronic Industries Association;
- an output power supply means or module 8 namely an electric heater output block, enabling to control the electric supply for one or more electric heating units;
- a temperature sensor means 10 exposed to the room temperature and emitting an be-analog-signal to an be-analog-/digital converter 9 which emits digital signals to be processed by the microprocessor means 5;
- a liquid crystal display 12 or any other means for displaying the information received from the driver 11 which serves to transform the input information into readable information;
- status LEDs 13, 13a which light up to indicate the status of the thermostat;
- a keyboard 17;
- a line monitoring means or module 18 serving to measure the supply voltage of the electric supply and to generate a signal which is received by the micro-processor.

Figure 12:
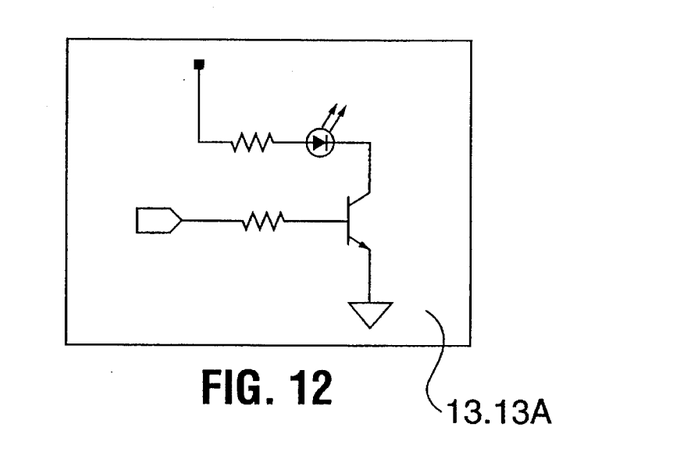
FIG. 12 shows an electronic circuit of the status LED's of the preferred embodiment.

The primary and secondary thermostats operate in the same manner except that the primary thermostat can send control commands to the secondary thermostats to program each secondary thermostat for the following modes: absent, night, day. Both thermostats have up and down buttons b1 and b2 respectively, an economy button b3, a configuration button b4, an enter button b5 and a lock button b6. Primary thermostat 2 has three additional buttons, namely: absent button b7; night button b8; and day button b9. The display 12 normally displays the ambient temperature. The display 12 can also display the temperature setting set by the up and down buttons b1 and b2. A red LED or status LED 13 (see FIG. 12) indicates that the thermostat is "on" (in operation) and the green LED 13a indicates the ECONOMY mode obtained by the ECONO button b3. In ECONOMY mode, the actual setting is, for example, about 3 degrees below the normal setting. However, this setting is the factory setting. The user can program the ECONOMY button b3 at any degrees under the normal set point (by 0.5 degree step). When continuously pressing the up button b1, the temperature display will automatically raise 1 degree per second. In this case in Celsius mode, the step size is 0.5 degree. In Farenheit mode, the step size is 1 degree. When the button b1 is released, the thermostat is set at the last value. The same holds true for the down button b2.

The LOCK means or button b6, shown on FIGS. 1, 2, is concealed behind the cover of the thermostat housing. When pressed, it de-activates the up and down buttons to prevent children and any unauthorized entity to change the thermostat settings. The LOCK button does not affect the ECONOMY mode. The "locking" function is performed by commands received from the microprocessor. When the user tries to modify the set temperature with the arrow keys, this bit is checked by the processor 5.

The thermostats are configurable by software in order to diminish the hardware costs. To enter into configuration mode, the person installing the system must push the configuration button b4. The up and down buttons change the value display. The "enter" button b5 saves the new value and moves to the next item.

Referring now to FIGS. 14 to 17, wherein the three flow charts show the complete set of commands used for the operation of the temperature regulating device and which constitutes the central control means.

In particular, the main program is devised in 5 blocks. Each block controls a specific function in the thermostat. When a block finishes its operation, return to the main program is effected.

The specific function of each block is described as follows:

Block A—Network Protecting Mode: This block provides the control for the network protecting mode. This program may run in "background". When a power failure occurs or when the SET point changes, this block is called up. This block limits the output signal for the baseboard heating to a calculated value The values shown are only for representation. Those values may be changed for optimization.

Block B—Temperature Control: This block calculates the output signal for the baseboard heater. The output signal is calculated by two formulas which are translated into numerical format for the micro-controller. The ambient temperature is compared to the SET temperature every cycle (ten seconds, for example). When the temperature differs from the SET temperature, the program checks for different flags like reset flag, SET point change, etc. If one of those flags has been changed, the output signal is recalculated and applied to the baseboard.

Block C—CEBUS® Communication: This block contains the codes specified by the EIA IS-60. They make all timing, control and transformation operations for reception and expedition of data packets over the power line network.

Block D—Keyboard: When a button is pressed, this block converts the signal received from the keyboard and executes the command. The buttons are: UP arrow, DOWN arrow, ECONOMY, CONFIG, ENTER and LOCK for all models and DAY, NIGHT and AWAY for the primary. Each button has a specific function in a specific mode. For example, the UP arrow key in "Normal" mode is used to increase the temperature. In configuration mode, this button is used to change the state or the value of the parameter.

Block E—Display: This block transfers the binary value that we have to display and transfers to the proper format at the LCD driver which shows the information at the specific place on the screen in a format readable by a human.

The values to be stored in the memory are the following:

the house code (CEBUS) (default 0000hex)

the CEBUS address (default 0000hex)

the temperature in Celsius (1) or Farenheit (0)

the DAY mode (normal or economy)

the NIGHT mode (normal or economy)

the AWAY mode (normal or economy).

The modes DAY, NIGHT AWAY each should be configured to a SET temperature, for example: DAY-22° C., NIGHT-18° C. and AWAY-15° C.

If no button is pressed, for example, during 45 seconds, the thermostat exits from its configuration mode and assumes its preceding state.

The house code and address are displayed in decimals (00000).

The minimum temperature enables to prevent freezing within the home.

The house code must be the same for all the primary and secondary thermostats.

The digital signal obtained from the temperature sensor 10 is sent to the micro-processor 5 as a binary number which is compared to a binary reference value contained in the memory 5a. This reference value corresponds to the temperature set by the user on the keyboard or is a value received in accordance with a definite format from another long distance control means or apparatus through the public supply network, converted by the communication block 7, processed by the microprocessor 5 and stored in the memory 5a.

This enables, for instance, any remote or long distance control means to send a signal to lower all thermostat settings in a given group of houses. In this case, remote control means could be home automation systems or energy management systems and a long distance control means—Hydro entity. However, in the latter case, it is necessary to use an "in house" controller, such as VIDEOWAY.

Figure 9:
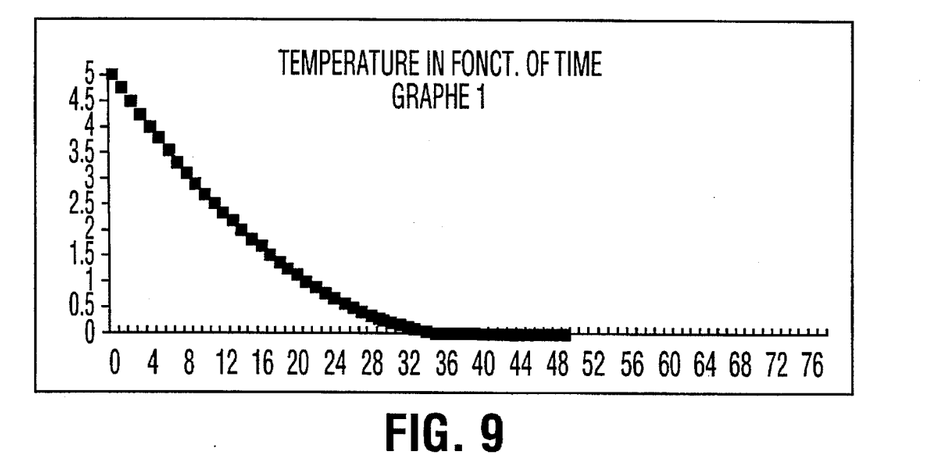
FIG. 9 and 10 show graphs used for illustrating the method of calculating the variation of the power output of the thermostat to maintain the ambient temperature of the room while avoiding undesirable or excessive temperature variations.
Figure 10:
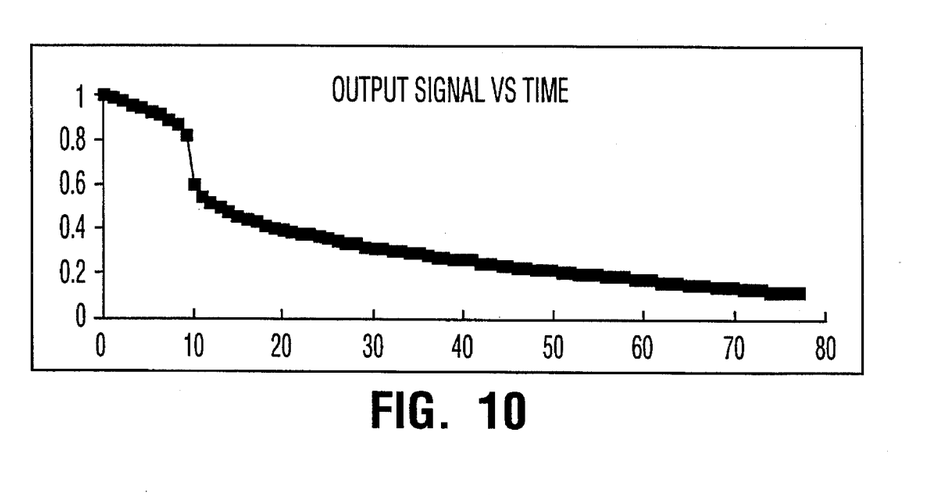

When the compared value is different to the value stored in the memory, a specific software program of the memory block is transferred to the micro-processor 5. This program calculates the difference between the ambient temperature and the temperature to be reached. Then it calculates the time required to reduce the calculated difference by a percentage (A). The resulting signal is transmitted to a transistor 23 (see FIGS. 5 and 13) which, upon conducting, activates the opto-electronic device 24 which controls the triac 14 series-connected with the temperature varying units such as electric baseboards 4 through the power lines J3-1 and J3-2. From the calculated time, one can produce an ideal curve (see FIG. 9) of the variation of the ambient temperature with respect to time, this curve being the result of a quadratic equation of the form $$dT = B \times t_c^2$$

where B is a constant and $T_c$ is the calculated time. This ideal curve indicates the time delay ($t_{x-t0}$) at the end of which the ambient temperature theoretically attains the set temperature. When the time $t_x$ is reached, the output signal S, which the signal which causes variation of the power input to the heater, will be maintained at a certain value in order to maintain constant the ambient temperature until a change in the room temperature takes place or until a new set temperature is entered into the system by the user. The output signal S (see FIG. 10) is calculated from a cubic equation having the following form:

$$t = A1(-S+C)^3 + D$$

wherein the constant D is calculated in such a way as to cause a point of the curve to correspond with the center of gravity of the surface under the curve of dT as a function of time. The constant C corresponds to another point of the curve which is calculated in such a way as to stabilize the signal S at time tx to a certain value capable of maintaining constant the ambient temperature.

In practice, a slight temperature variation will be produced during the heating and the cooling periods of the room. This is why the thermostat will correct the output signal S at regular intervals as a function of these variations.

These operations are maintained until the ambient temperature reaches the set temperature.

These calculated values are then converted to digital values and integrated within the software program. The result is that the signal S will correspond to a percentage of a given time during which the TRIAC 14 will be maintained ON to supply the baseboard. In this case TRIAC 14 will stay ON for a period of time, for example if the calculated duty cycle is 50% the TRIAC 14 will be activated 5 seconds ON and 5 seconds OFF.

Figure 5:
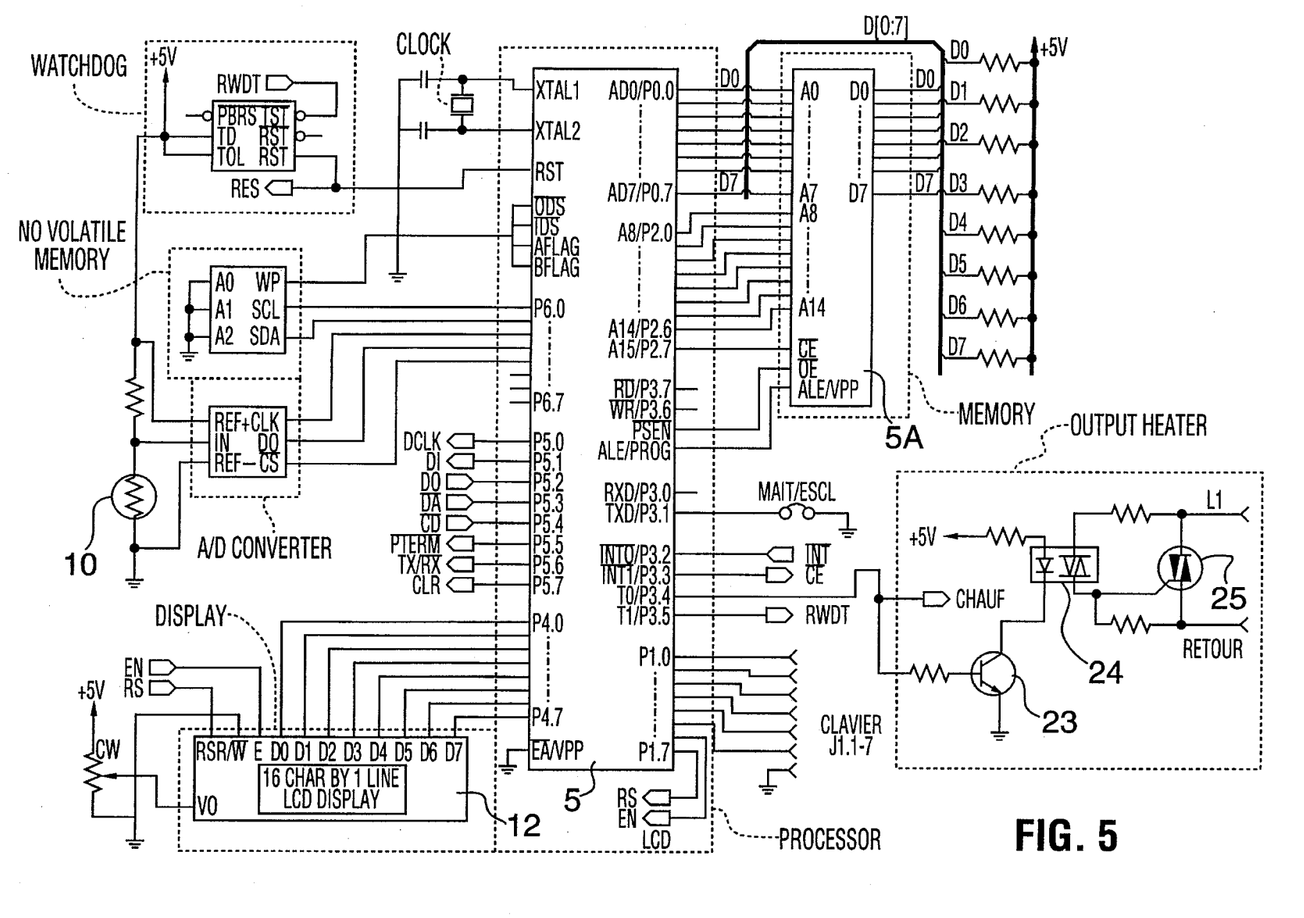
FIG. 5 shows an electronic circuit of the preferred embodiment of the present invention.

FIG. 5 shows a preferred embodiment of the present invention shown on FIG. 4. FIG. 5 includes the watchdog provided to reset the processor in case of a malfunction, the non-volatile memory to preserve data in case of power failure, the A/D converter to convert the analog signals from temperature sensor to a digital signal to the processor, the display, the processor provided to run program from memory and the output heater to drive the baseboard heater.

Figure 6:
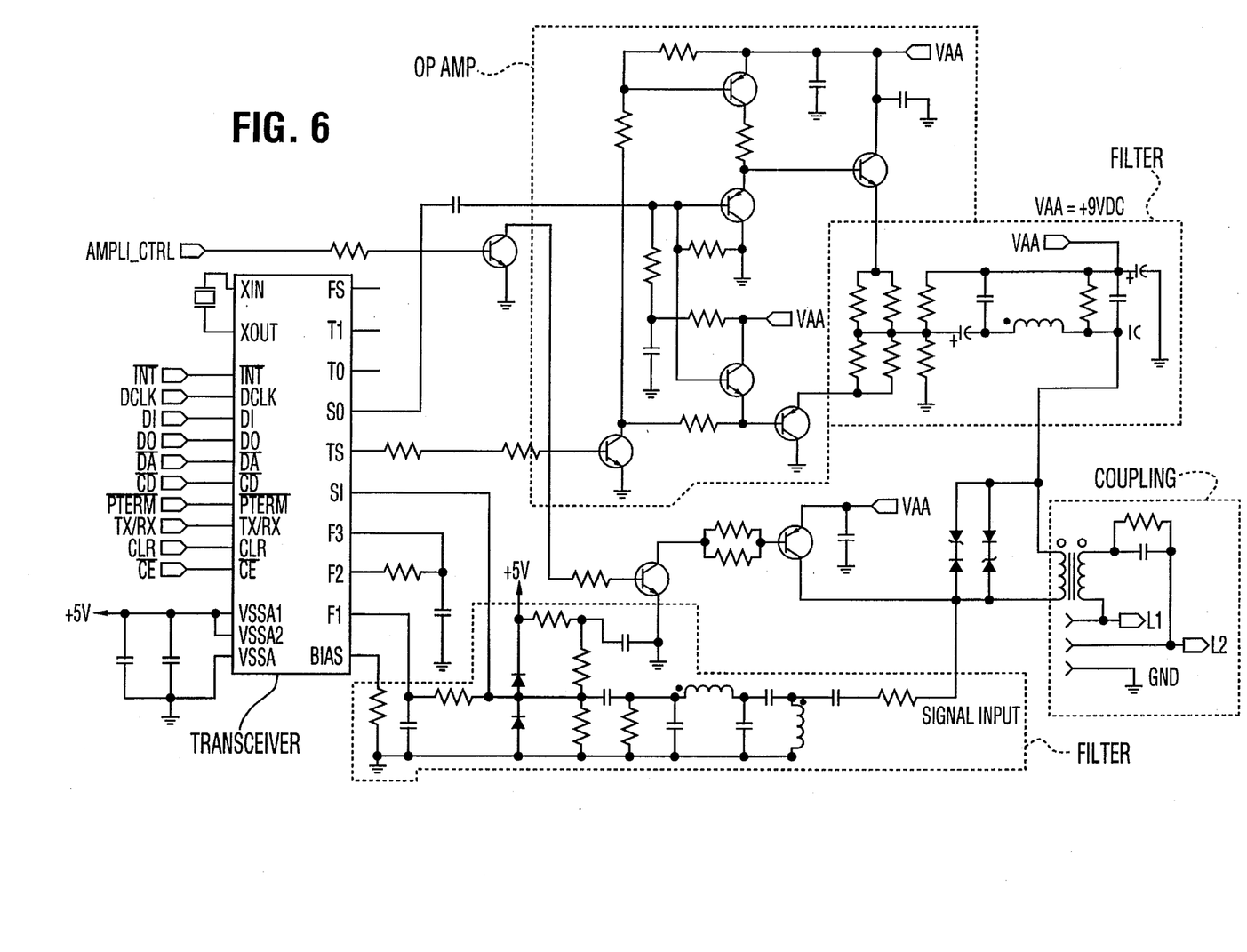
FIG. 6 shows an electronic circuit of the communication block of the preferred embodiment.

When the processor of FIG. 5 receives a command from the user via the keyboard to launch information to another device, said processor will translate this command into a serial sending packet and sends signals to the transceiver of FIG. 6. The transceiver will format the packet into a high frequency signal and sends it to the amplifier block. The signal will then pass to a filter through the power line. On the other side, the signal is received from the power line over the coupling block, passing through a pass band filter and to the transceiver. The transceiver will decode the high frequency signal and send it to the processor.

Figure 13:
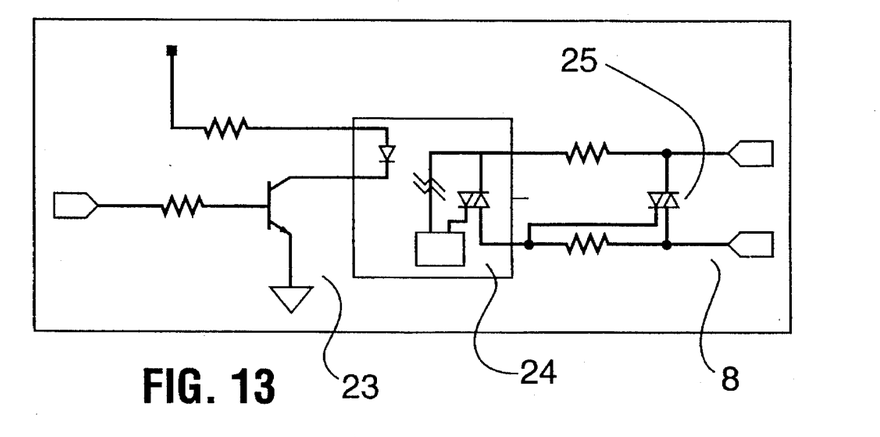
FIG. 13 shows an electronic circuit of the output heater module.
Figures 14, 15:
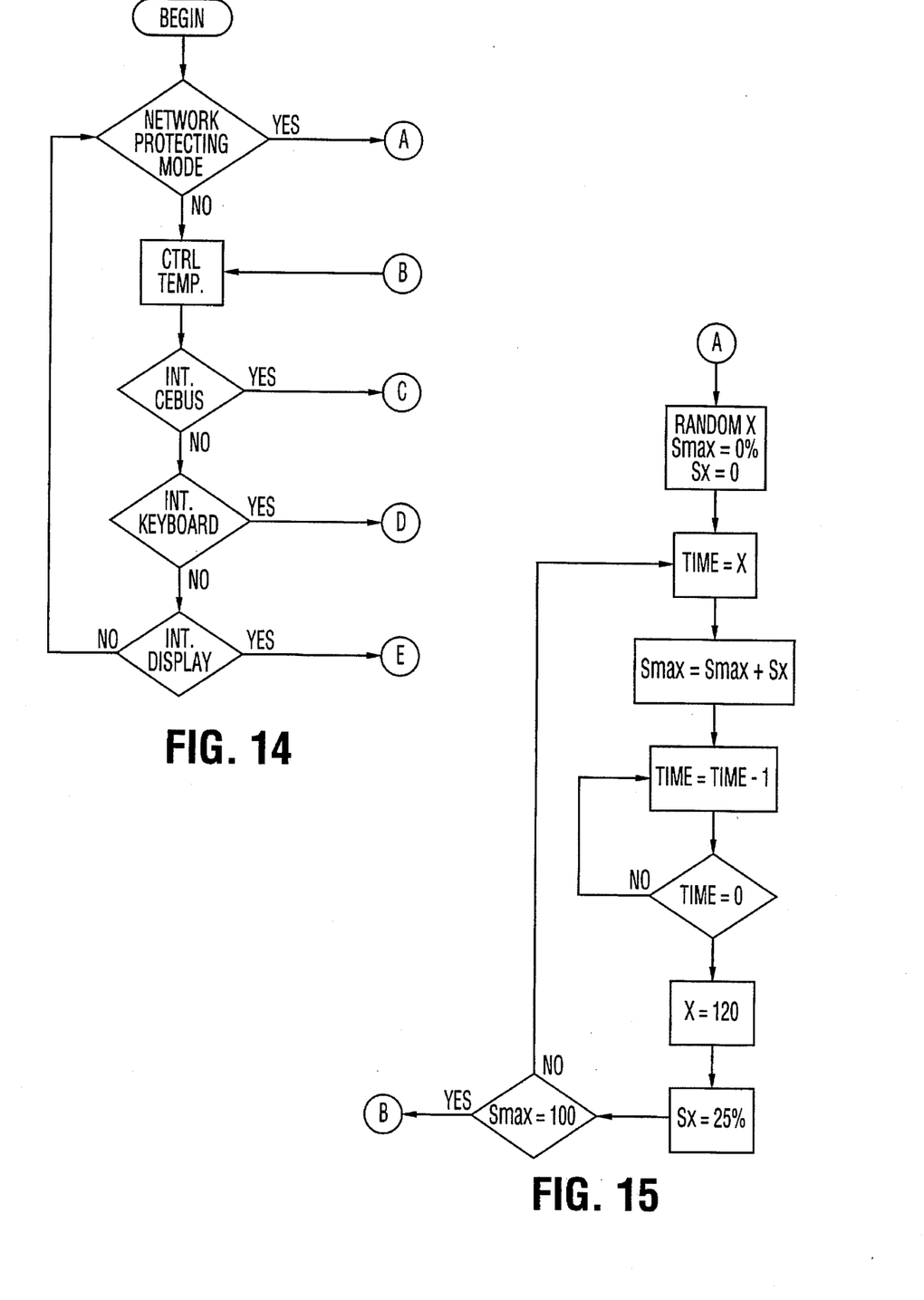
FIGS. 14 to 17 show flow charts of the commands controlling the operation of the present invention.
Figure 16:
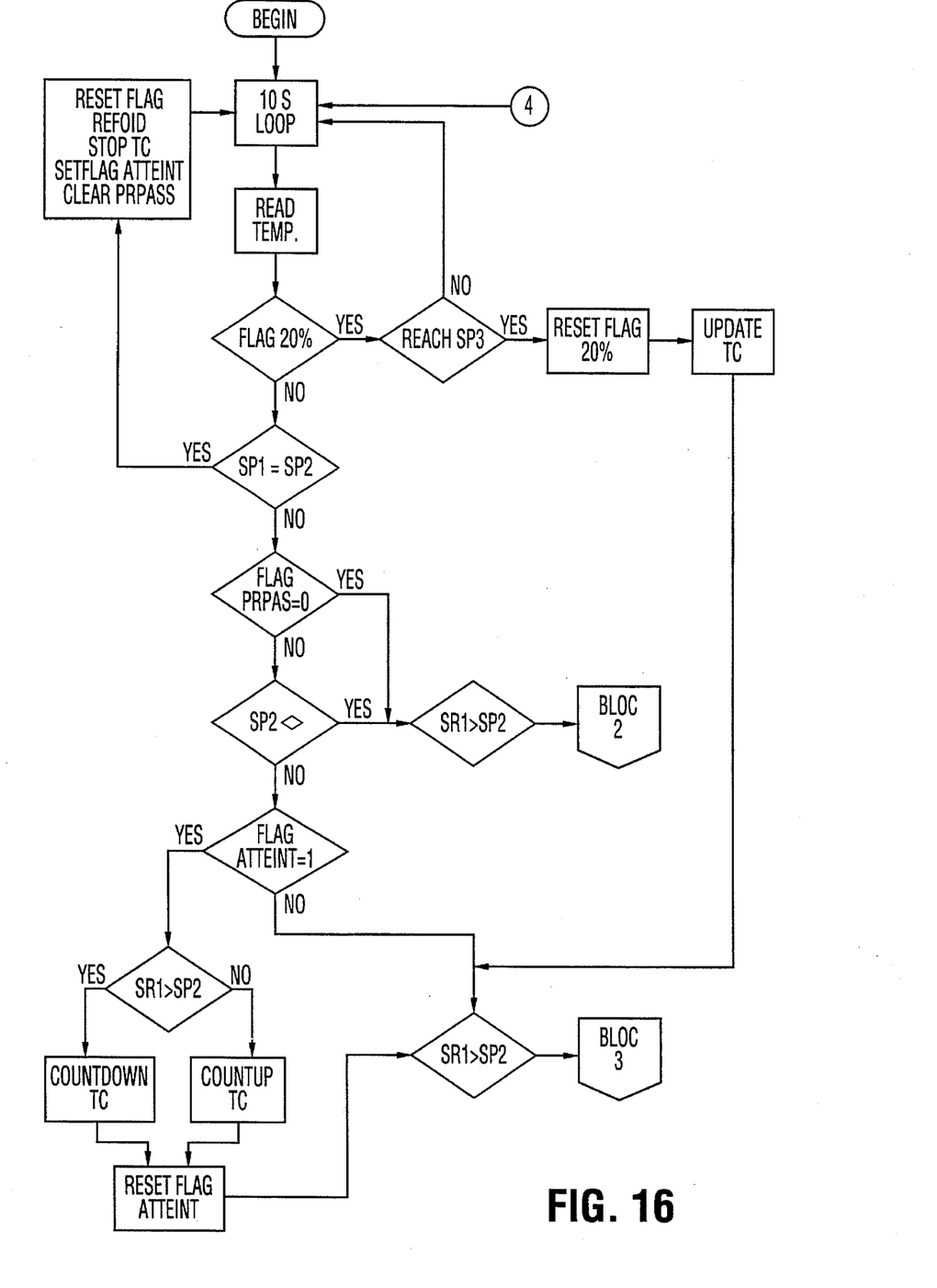
Figure 17:
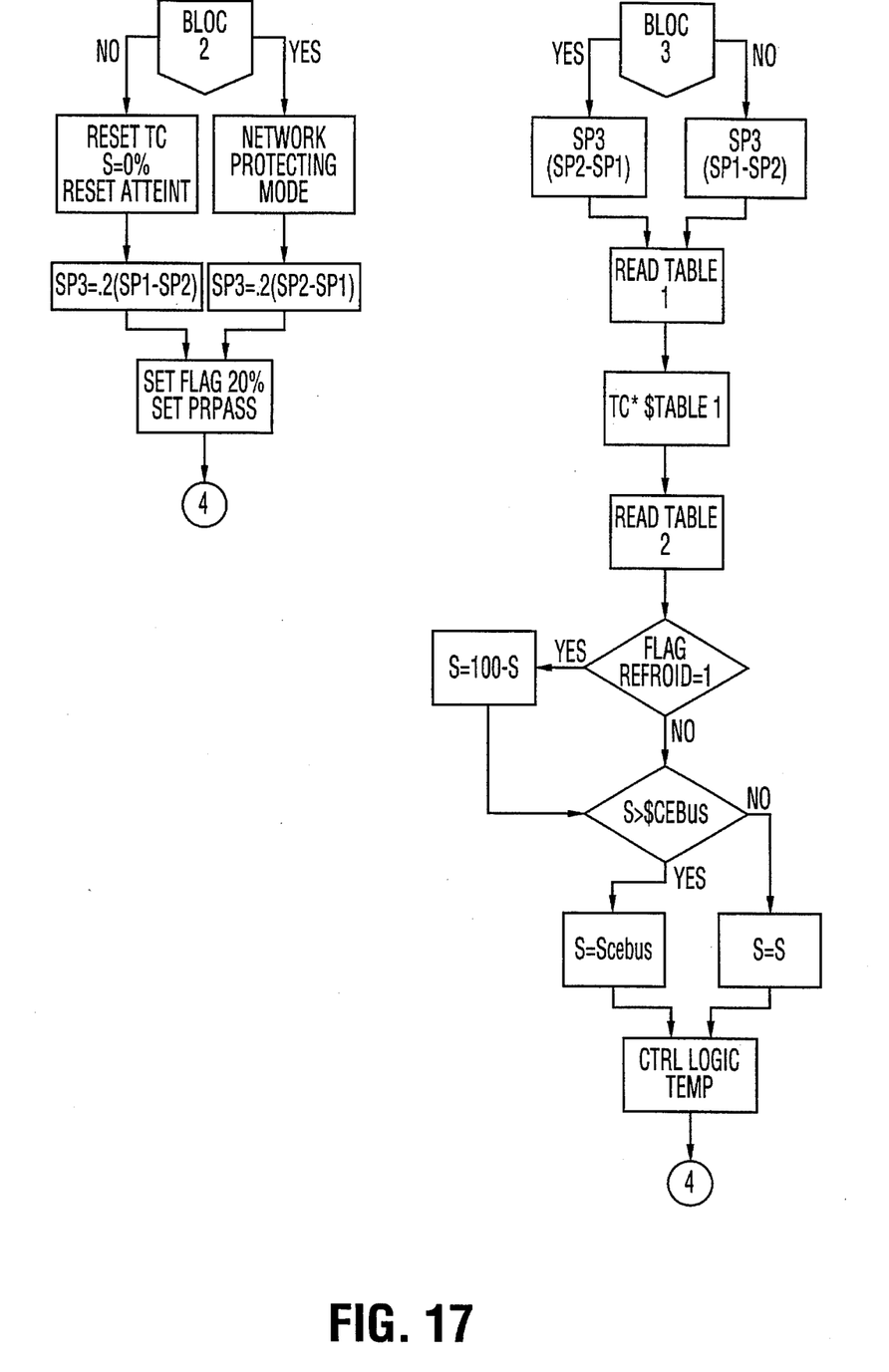

FIG. 13 shows an electronic circuit of the output heater module shown on FIG. 5. When a variable in the memory space of the processor is set to "one", an output signal is applied to the transistor 23. When this "one" is polarized, the optoisolator TRIAC driver 24 activates the TRIAC 25 on the main AC line corresponding to the zero voltage crossing. In that time the baseboard heater is activated.

Figure 7:
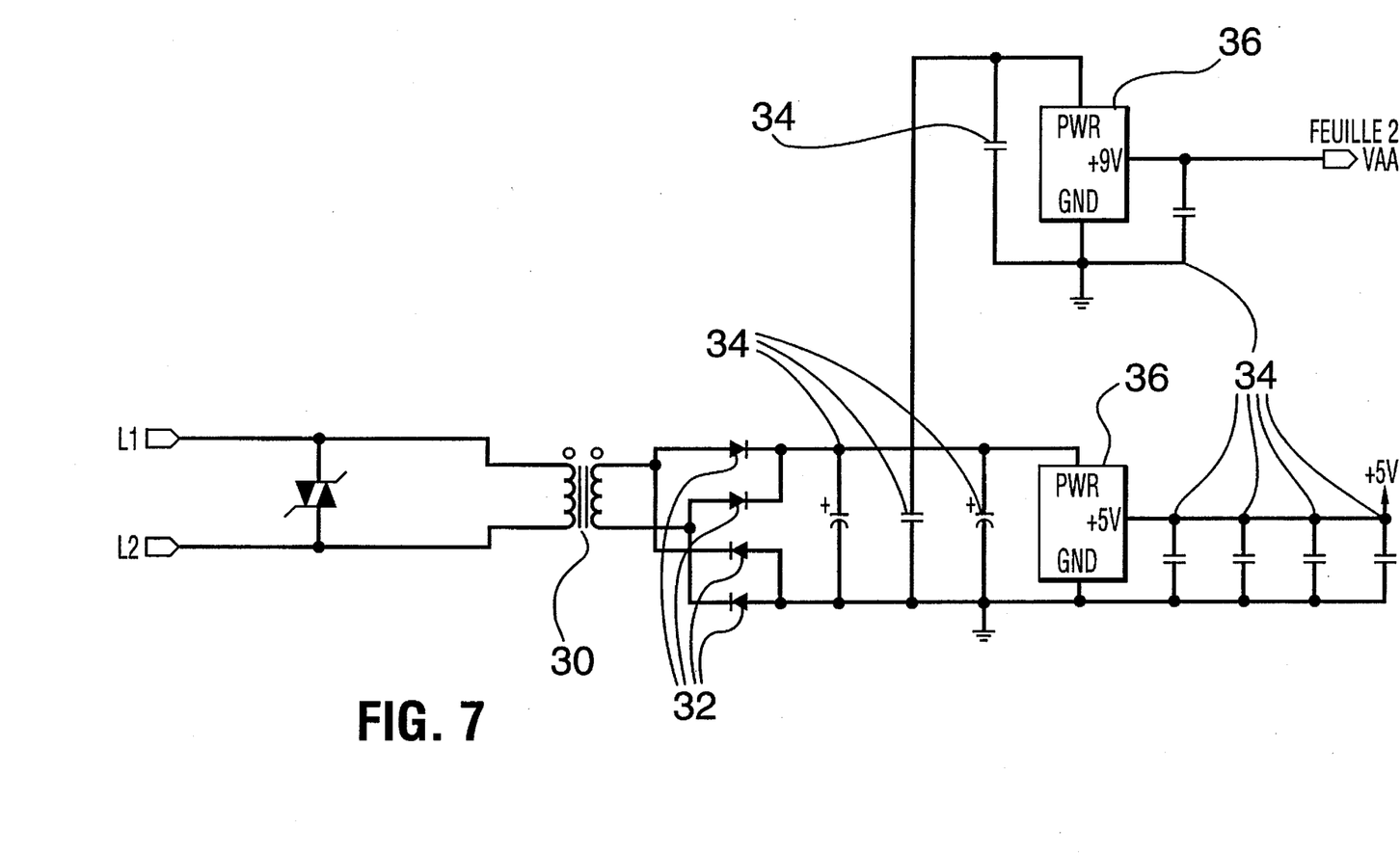
FIG. 7 shows an electronic circuit of the power supply of the preferred embodiment.
Figure 8:
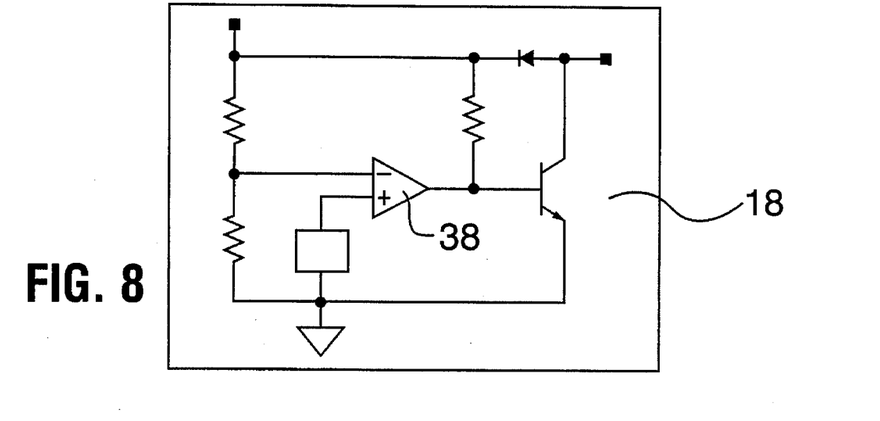
FIG. 8 shows an electronic circuit of a line monitor of the preferred embodiment.

The power supply means 6 combined with the line monitor means 18 (see FIGS. 4, 7 and 8) show a network protecting means of the present invention. The power supply block 6 converts the alternating current coming from the supply through a transformer 30, diodes 32, condensers 34 and a voltage regulator 36 shown in FIG. 7 to a continuous current suitable for the proper functioning of the electronic circuit. The line monitor means or circuit 18 of FIG. 8 comprises a comparator which compares the voltage of the supply voltage to a reference voltage; when the supply voltage decreases below the reference voltage, a signal is transmitted to stop operation of the microprocessor unit 5. In this case, comparator is used to "anticipate" the voltage drop and send an interrupt signal to the microprocessor before a power failure. This unit inputs the binary value 1 into the register of the non-volatile memory 5a. Upon restoration of the energy supply, the unit accomplishes a program which verifies the value in the register. If this value corresponds to the binary value 1, the apparatus enters into a network protection mode. This protection consists of limiting the supply of the output power to the baseboard in a gradual manner for a time T independently of the value calculated for the output signal S. The network protection is accomplished in the following manner:

First, the central processor means or unit 4 generates a random number located between two values. This generated number serves to determine the time period corresponding to the first phase of the power restoration. During this first phase, the output signal S will be limited to S–S=0%, i.e. $S_{maximum}$ or $\phi$. In a second phase, the output signal will be limited to $S_{maximum}=S_{maximum}+S_x$ for a time corresponding to $S_{maximum} \times T$. This phase will be repeated until $S_{maximum}=100\%$. $S_x$ corresponds to a constant enabling optimizing the power restoration.

In this case the random method is applied during the network protecting mode. For example: in the protecting mode it is calculated first a number (randomly). This number corresponds to a period of time when the baseboard heating unit will be maintained at the OFF position. After that a limited duty cycle will be applied for a period of time. Then, the duty cycle will be increased to reach 100% which may take, for example, 15 minutes. However, the latter time may be modified to obtain the maximum performance.

This network protecting method could also be effected without using the line monitor means 18. In this case, upon power restoration, a first software program would be accomplished to configure the register to the binary value 1. In this manner, each time the thermostat would be switched ON, the network protection would be activated.

Each time the output signal is applied to the baseboard, a comparison of the register S set will be effected. When the latter is 1, the network protection procedure will be applied. The advantage of using a software method allows to activate a network protecting means shown on FIG. 7 not only on power failure, but also when the SET temperature changes.

The secondary thermostat has six buttons while the primary thermostat has 9 buttons (see FIGS. 2 and 3). FIGS. 2 and 3 show the keyboard for the master thermostat (FIG. 2) and the slave (FIG. 3). FIG. 2 has 12 elements, such as: the Economy LED (13A), the Heat LED (13), the Display (12), the Up Arrow key (B1), the Down Arrow key (B2), the Economy key (B3), the Day Mode key (B9), the Night mode key (B8), the Away Mode key (B7), the Config key (B4), the Enter key (B5) and the Lock key (B6). The only difference between the master and slave keyboards is the fact that the slave does not have the Day, Night and Away modes. These buttons form a matrix of three by three connected to the micro-processor. When one button is pressed, a binary code is received by the microprocessor. The code corresponds to a specific function which is stored in the memory.

The up and down button serve to activate a counter unit which will indicate the binary value of the temperature to be reached (set temperature) in normal mode.

When the user pushes the ECONOMY button, a specific binary code will be transmitted to the processor which will add the binary value 1 to its ECONO register contained within the memory unit. This register has a length of one bit. When there is a change in the state of this register from binary value 0 to binary value 1, the register containing the temperature to be reached in ECONOMY mode will then be copied in the register of the temperature to be reached. This value is kept in the register of the non-volatile memory. Upon a change of the register ECONO from binary value 1 to binary value 0, the value of the "normal" register is copied in the register of the temperature to be reached. Moreover, the binary value 1 is stored in the register $S_{set}$ thus activating the network protection mode during change from ECONOMY mode to NORMAL mode.

When pressing on the LOCK button, a specific binary code is transmitted to the processor unit and the latter adds the binary value 1 to the register lock contained in the memory unit. This register has a length of one bit. Each time the user pushes the up or down button, the central processor means verifies the state of this register. If the register contains binary value 1, it is then not possible to change the value of the set temperature. This characteristic offers the advantage of preventing any changes in the set temperatures, therefore avoiding overheating.

Figure 11:
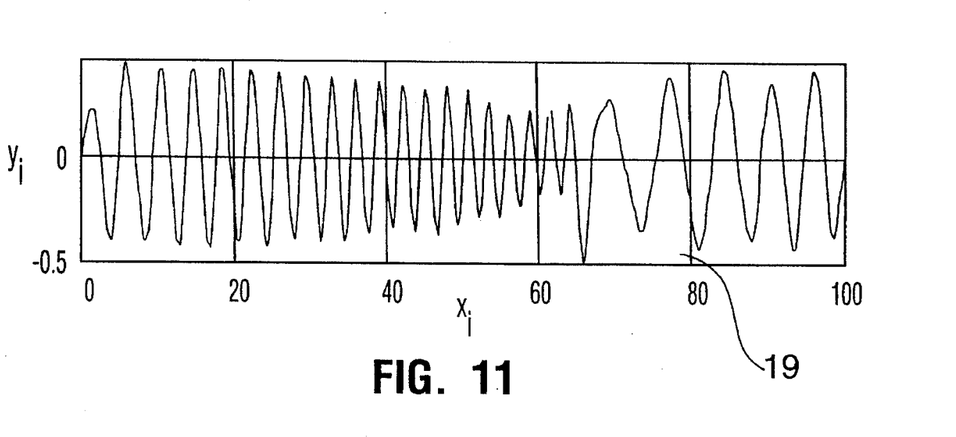
FIG. 11 shows a graph of the control signal.

Another important characteristic of this invention consists in the capacity of the thermostat to transmit and receive information over the power line. This information is transmitted by means of a high frequency signal applied to the frequency of the alternating current of the power line. This signal, as shown in FIG. 11, corresponds to the symbol, the binary value of which is 1. The binary value 0 is represented by two identical symbols. This information is transmitted in accordance with a protocol defined by EIA, standard IS-60 (CEBUS)®, as it was described before.

One of the most important features of the present invention is the fact that all the thermostats can be configured to receive or transmit over the power line. Each thermostat possesses a unit address code and a house address code. These codes enable to identify a specific thermostat during communication and these codes are stored in the nonvolatile memory 5a (see the above explanation concerning the configuration method).

Another important feature of the present invention consists in the existence of a primary thermostat which has the same characteristics as the secondary thermostats but have three additional buttons corresponding to three possible situations. When one of these buttons is pressed, the processor 5 generates a signal of a predetermined specific format. This signal is transferred in a binary manner to the communication block 7 which converts the code into the signal shown on FIG. 11 and applied to the power line. The secondary thermostats receive the high frequency signal which, through their communication block, are converted into binary format and transferred to the microprocessor. The microprocessor 5 compares the received codes with a table contained in the memory 5a and verifies the validity of these codes. Each of the received codes corresponds to a specific function of the thermostat such as, without limitation, changing the thermostat state from an economy mode to a normal mode, configuring a new set temperature, etc. Once validation of the codes has been effected, a command is transmitted by the primary thermostat to the secondary thermostats in the same manner as if the user would have manually applied this command.

The advantage of this function is to permit the user to configure all other thermostats from a central point of the house since the majority of users do not bother to change the set temperatures for the day, for the night and when they leave their homes which they should do for each thermostat in order to save energy. It is also very important to mention that the secondary thermostats are autonomous from the primary thermostat in that they do not need the-latter to operate. Each thermostat is independent from the others. Moreover, all the thermostats can respond to all other types of apparatuses communicating under the same CEBUS® protocol enabling a bi-directional exchange of information.

It is also possible to install more then one primary thermostat per house. The only difference with the secondary thermostats is that the primary thermostat can SET at a single point in the house the temperature of every room. Each thermostat has all the logic to communicate with the other control means, such as home automation systems or a long distance control means, such as a Public power supply entity.

Numerous and varies arrangements may be utilized by those skilled in the art without departing from the spirit and scope of the invention.

I claim:

1. A system for centralized controlling of a plurality of temperature regulating devices by an existing network of power lines comprising:

a central control means provided to send or receive predetermined commands to and from;

a plurality of temperature regulating devices, each of said temperature regulating devices comprising a communication means adapted to provide two way communication with said central control means;

a microprocessor means adapted to store predetermined information received from said central control means and to provide a proper functioning of said device;

a temperature sensor means adapted to send signals to said microprocessor means; and an output supply means adapted to supply power to temperature varying units;

wherein each of said temperature regulating devices further comprises a network protecting means adapted to regulate the supply of power to said output supply means dining sudden changes in the power supply or due to changes in temperature conditions.

2. A system according to claim 1, wherein each of said temperature regulating devices further include locking means to prevent an unauthorized entry to change temperature conditions of said temperature regulating device, wherein locking function of said locking means is performed by means of predetermined set of commands received from said microprocessor means.

3. A system according to claim 2, wherein each of said temperature regulating devices comprises at least one primary thermostat means and a predetermined number of a secondary thermostat means, and wherein said primary and secondary thermostat means are adapted to communicate with said central control means in independent mode.

4. A system according to claim 3, wherein said primary and secondary thermostat means are adapted to communicate with each other by means of commands sent through their own microprocessor means.

5. A system according to claim 3, wherein said primary thermostat means are adapted to configure conditions of said secondary thermostat means.

6. A system according to claim 5, wherein configuration of said secondary thermostat means is provided by means of sending commands through said microprocessor means.

7. A system according to claim 3, wherein said locking means of said primary and secondary thermostat means are activated in independent manner.

8. A system according to claim 1, wherein said central control means send or receive commands to said temperature regulating devices by means of high frequency signals applied to said power lines.

9. A system according to claim 1, wherein said output supply means supply power to temperature varying units in a time delay mode to avoid undesirable or excessive temperature variations.

10. A system according to claim 9, wherein said output supply means supply power to said temperature varying units by means of predetermined commands sent from said microprocessor means.

11. A system according to claim 1, wherein said network protecting means regulate the supply of power to said output supply means by means of predetermined commands sent from said microprocessor means.

12. A system according to claim 1, wherein said temperature varying traits are heating units.

13. A system according to claim 1, wherein said network protecting means comprises a power supply means adapted to receive power through said power supply lines; and a line monitor means adapted to determine sudden change of power.

14. A system according to claim 13, wherein said network protecting means is activated by signals sent from said line monitor means during sudden change of power voltage.

15. A system according to claim 13, wherein said network protecting means is activated by means of predetermined commands sent from said microprocessor means during changes of set temperature.

16. A system according to claim 1, wherein said output supply means supply power to said temperature regulating units by means of time delay mode consisting in limiting the time of a current supply to said units.

17. A system according to claim 16, wherein during network protecting mode, supply of the current to each of said temperature varying units is provided randomly to prevent simultaneous activation of all of said output power supply means.

18. A system according to claim 1, wherein said central control means comprises a predetermined sequence of commands stored in a memory of said microprocessor means.

19. A system according to claim 18, wherein said central control means further comprises a long distance control means provided to monitor and modify temperature setting of said temperature regulating devices.

20. A method of a centralized control of a plurality of temperature regulating devices comprising:

sending commands to each of said temperature regulating devices by communication means;

receiving signals from temperature sensors of said temperature regulating devices after those signals are being processed by a microprocessor means of said devices;

verifying signals received from said temperature regulating devices and sending appropriate correcting commands necessary to amend the temperature conditions of each of said temperature regulating devices;

wherein a process of supplying power to temperature varying units is provided by means of an output power supply means in a time delay mode to avoid undesirable or excessive temperature variations.

21. A method according to claim 20, wherein a process of power supply to temperature varying units is provided by means of a network protecting means regulating the supply of power during sudden changes in power supply or due to changes in temperature conditions.

22. A method according to claim 21, wherein said network protecting mode comprises the following steps:

detecting a sudden change of power voltage or sudden temperature change;

transmitting command to said microprocessor means;

entering network protecting mode causing a limitation of a signal to said output power supply means.

23. A method according to claim 22, wherein detection of a sudden change in power voltage is provided by a power supply means and a line monitor means.

24. A method according to claim 22, wherein detection of sudden change of power voltage or sudden temperature change is provided by means of predetermined commands sent to said microprocessor means.

25. A method according to claim 20, wherein said time delay mode provided for limiting power supply to said temperature varying units comprises the following steps:

verification of the difference between an ambient temperature and a set temperature by means of signals received from said temperature sensor means;

calculating a time delay at the end of which the ambient temperature will reach the set temperature by means of said microprocessor means;

sending signals causing variation of power supply to said output supply means, and wherein said signal is being maintained at a certain value to keep the ambient temperature substantially constant;

correcting said signal at regular intervals.

26. A temperature regulating device comprising:

a communication means adapted to provide two way communication through an existing network of power lines;

a microprocessor means adapted to store predetermined information received from said communication means and to provide a proper functioning of said device;

a temperature sensor means adapted to send signals to said microprocessor means; and an output supply means adapted to supply power to temperature varying units;

wherein said device is further comprising a network protecting means adapted to regulate the supply of power to said output supply means during sudden changes in the power supply, or due to changes in temperature conditions.

27. A device according to claim 26, further including locking means to prevent an unauthorized entry to change temperature conditions of said temperature regulating device;

wherein locking function of said locking means is performed by means of predetermined set of commands received from said microprocessor means.

28. A device according to claim 27, wherein said temperature regulating device comprises at least one primary thermostat means and a predetermined number of secondary thermostat means and wherein said primary and secondary thermostat means are adapted to communicate through said communication means in independent mode.

29. A device according to claim 28, wherein said primary and secondary thermostat means are adapted to communicate with each other by means of commands sent through their own microprocessor means.

30. A device according to claim 28, wherein said primary thermostat means is adapted to configure conditions of said secondary thermostat means.

31. A device according to claim 30, wherein configuration of said secondary thermostat means is provided by means of sending commands through said microprocessor means.

32. A device according to claim 28, wherein said locking means of said primary and secondary thermostat means are activated in independent mode.

33. A device according to claim 26, wherein said communication means are adapted to send or to receive commands to and from said temperature regulating device by means of high frequency signals applied to said power lines.

34. A device according to claim 26, wherein said output supply means supply power to said temperature varying units in a time delay mode to avoid undesirable or excessive temperature variations.

35. A device according to claim 26, wherein said output supply means supply power to said temperature varying units by means of predetermined commands sent from said microprocessor means.

36. A device according to claim 26, wherein said network protecting means regulate the supply of power to said output supply means by means of predetermined commands sent from said microprocessor means.

37. A device according to claim 26, wherein said network protecting means comprises:

a power supply means adapted to receive power through said power supply lines; and a line monitor means adapted to determine sudden change of power.

38. A device according to claim 37, wherein said network protecting means is activated by signals sent from said line monitor means during sudden changes of power voltage.

39. A device according to claim 37, wherein said network protecting means is activated by means of predetermined commands sent to said microprocessor means due to changes of set temperature.

40. A device according to claim 26, wherein said output supply means supply power to said temperature varying units by means of time delay mode consisting in limiting the time of a current supply to said units.

41. A device according to claim 40, wherein during network protecting mode, supply of the current to each of said temperature varying units is provided randomly to prevent simultaneous activation of all of said output power supply means.

42. A device according to claim 26, wherein said communication means is adapted to receive commands from a central control means comprising a predetermined sequence of command stored in a memory of said microprocessor means.

43. A device according to claim 42, wherein said central control means further comprises a long distance control means provided to monitor and modify temperature setting of said temperature regulating devices.

* * * * *